United States Patent
Kikuchi

(10) Patent No.: US 7,580,191 B2
(45) Date of Patent: Aug. 25, 2009

(54) WAVELENGTH BRANCHING FILTER AND OPTICAL COMMUNICATION MODULE

(75) Inventor: Toshihiro Kikuchi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 504 days.

(21) Appl. No.: 11/445,088

(22) Filed: May 31, 2006

(65) Prior Publication Data

US 2007/0019286 A1    Jan. 25, 2007

(30) Foreign Application Priority Data

Jul. 20, 2005    (JP) ............................. 2005-209580

(51) Int. Cl.
G02B 27/14    (2006.01)
G02B 21/10    (2006.01)

(52) U.S. Cl. ...................... 359/636; 359/589
(58) Field of Classification Search ................ 359/636, 359/634, 629, 583, 589; 385/79, 85
See application file for complete search history.

(56) References Cited

U.S. PATENT DOCUMENTS 6,792,181 B2    9/2004    Sasaki

2004/0184385 A1    9/2004    Katsuma et al.
2004/0184811 A1*   9/2004    Takamori ..................... 398/141

FOREIGN PATENT DOCUMENTS

| CN | 99122321 | 5/2000 |
| JP | 10-10354 | 1/1998 |

OTHER PUBLICATIONS

Chinese Office Action dated Feb. 20, 2009 in Chinese Application No. 2006-10107511.9.

* cited by examiner

Primary Examiner—Alicia M Harrington
(74) Attorney, Agent, or Firm—Beyer Law Group LLP

(57) ABSTRACT

There is provided a low-cost wavelength branching filter that transmits lights of 1310 nm wavelength band, and reflects light of 1490 nm and 1650 nm wavelength bands. In one embodiment, a wavelength branching filter includes a first multilayer film filter positioned in a light incoming side on a glass substrate and a second multilayer film filter positioned in a light outgoing side, and the first multilayer film filter has characteristic in reflecting light of 1490 nm wavelength band and transmitting light of 1310 nm wavelength band, and the second multilayer film filter has characteristic in reflecting light of 1650 nm wavelength band and transmitting light of 1650 nm wavelength band and reflecting light of 1310 nm wavelength band.

2 Claims, 3 Drawing Sheets

WAVELENGTH BRANCHING FILTER AND OPTICAL COMMUNICATION MODULE

BACKGROUND OF THE INVENTION

1. Field of the Invention

The present invention relates to a wavelength branching filter branching light of a desired wavelength and an optical communication module using the same, particularly, to a wavelength branching filter branching light of a specific wavelength used in the optical communication module and an optical communication module using the same.

2. Description of the Related Art

In an optical communication module that implements a two-way communication, there has been known a two-wavelength mode in which two-way signal lights have different wavelength. Light of 1310 nm wavelength band and light of 1490 nm wavelength band are generally used as signal light. In addition, light of 1650 nm wavelength band is used as monitor light required for a line construction. The construction in which these lights can be respectively separated is required in the optical communication module. The optical communication module which is an optical communication module that implements the two-way communication and has the construction capable of separating light of a plurality of wavelengths is disclosed, for example, in JP-A-10-10354.

In case that the light collecting unit and light emitting unit are disposed along the same axis as a cross section of an optical fiber and orthogonally thereto, respectively, the wavelength branching filter is provided at an intersection position of the optical axes of the light collecting unit and the light emitting unit, thereby branching light. The wavelength branching filter is disposed to be at the angle of 45 degrees to the optical axis, whereby transmitting light of 1310 nm wavelength band, and reflecting lights of 1490 nm and 1650 nm wavelength bands are required.

However, the range of 1490 nm to 1650 nm cannot be simultaneously covered in the mixture of $SiO_2$ and $Ta_2O_5$ used as a material of a common multilayer film filter. As the result, a filter that reflects only light of 1650 nm wavelength band is provided in a transmitting light side so that light of 1650 nm wavelength band is not involved in the light collecting unit that collects light of 1310 nm wavelength band. Though, in this case, positioning is required due to the increase in the number of parts, thereby raising the cost thereof.

Further, changing the film material can widen the wavelength range of reflecting light. That is, $Nb_2O_5$ or $TiO_2$ with higher refraction index than $Ta_2O_5$ may be used. However, the wavelength branching filter is fixed within the optical communication module by UV adhesive, whereby the optical communication module can be manufactured at low cost, but since the UN adhesive cannot be used for this material, another fixing method is required, thereby raising the cost thereof.

SUMMARY OF THE INVENTION

The object of the present invention is to provide a low-cost wavelength branching filter that transmits light of 1310 nm wavelength band, and reflects light of 1490 nm and 1650 nm wavelength band, and an optical communication module using the same in consideration of the above-referenced problem.

To solve the above-referenced problem, the wavelength branching filter of the present invention includes a first multilayer film positioned in an incoming light side on a glass substrate and a second multilayer film positioned in an outgoing light side, wherein the first multilayer film has characteristic in reflecting light of 1490 nm wavelength band and transmitting light of 1310 nm wavelength band, and the second multilayer film has characteristic in reflecting light of 1650 nm wavelength band and transmitting light of 1310 nm wavelength band.

In addition, the optical communication module according to the embodiment of the present invention includes a light collecting unit collecting light of 1310 nm wavelength band, which is disposed along an optical axis of the optical fiber, a light emitting unit emitting light of 1490 nm wavelength band, which is disposed orthogonally to the optical axis of the optical fiber, and the wavelength branching filter which is disposed at an intersection position of the optical axes of the light collecting unit and the light emitting unit has a first multilayer film positioned in an incoming light side on a glass substrate and a second multilayer film positioned in an outgoing light side, the first multilayer film having characteristic in reflecting light of 1490 nm wavelength band and transmitting light of 1310 nm wavelength band, and the second multilayer film having characteristic in reflecting light of 1650 nm wavelength band and transmitting light of 1310 nm wavelength band, wherein light which the light emitting unit transmits is reflected to a cross-section direction of the optical fiber and light transmitted from the cross section of the optical fiber is transmitted.

In the wavelength branching filter according to the embodiment of the present invention, when the first multilayer film disposed in the incoming light side has characteristic in reflecting light of 1490 nm wavelength band and transmitting light of 1310 nm wavelength band, and the second multilayer film disposed in the outgoing light side has characteristic in reflecting light of 1650 nm wavelength band and transmitting light of 1310 nm wavelength band, since light of 1490 nm wavelength band is reflected in the incoming side, the dual focusing of the light can be prevented and light of 1490 nm wavelength band of the second multilayer film has low rectangular property, whereby the thickness of the film can be thinned, thereby the cost-down being achieved.

Further, in the optical communication module according to the embodiment of the present invention, since the above-referenced wavelength filter is disposed at the intersection position of the optical axes of the light collecting unit and the light emitting unit, the module can be constructed at low cost.

DESCRIPTION OF THE PREFERRED EMBODIMENT

Figure 1:
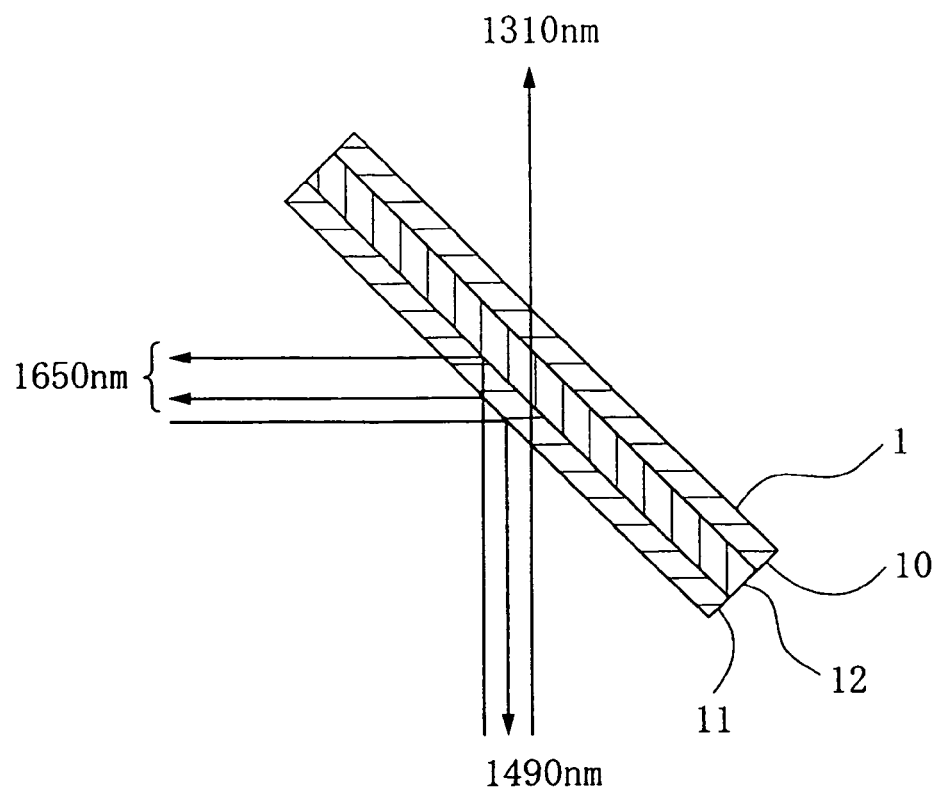
FIG. 1 is a cross-sectional view of a wavelength branching filter in this embodiment.

The embodiments of the present invention will be specifically described with reference to the drawings. FIG. 1 is a cross-sectional view of a wavelength branching filter 1 in this embodiment. As shown in FIG. 1, the wavelength branching filter 1 according to the embodiment of the present invention is constituted by a first multilayer film filter 11 and a second multilayer film filter 12 on a glass substrate 10, all of these first multilayer film filter 11 and second multilayer film filter 12 are achieved from the construction forming the film consisting of $SiO_2$ and $Ta_2O_2$ and having the thickness given from the formula below in a multilayer film form and the construction forming the film having the thickness adjusted to constrain the sidelobe in a multilayer film form.

$$d=\lambda/4\sqrt{n \cdot n0 \cdot \sin\theta}$$ (Formula 1)

Here, d represents the film thickness (nm), λ represents the reflection center wavelength (nm), n represents the refraction index of film, n0 represents the refraction index of light incident medium and θ represents the incident angle (radian) of light to the multilayer film. In addition, the first multilayer film filter 11 is disposed in the incoming side of light and the second multilayer film filter 12 is disposed in the outgoing side of light while the wavelength branching filter 1 is at the angle of 45 degrees to the optical axis of light.

The first multilayer film filter 11 has characteristic in reflecting light of 1490 nm wavelength band and transmitting light of 1310 nm wavelength band. Further, the second multilayer film filter 12 has characteristic in reflecting light of 1650 nm wavelength band and transmitting light of 1310 nm wavelength band. As the result, light of 1310 nm wavelength band received into the wavelength branching filter 1 is just transmitted and light of 1490 nm wavelength band received into the wavelength branching filter 1 is reflected in the direction of 90 degrees by the first multilayer film filter 11. Light of 1650 nm wavelength band is reflected in the direction of 90 degrees to both the first multilayer film filter 11 and the second multilayer film filter 12, and is not transmitted in the direction to which light of 1310 nm wavelength band is transmitted.

Figure 2:
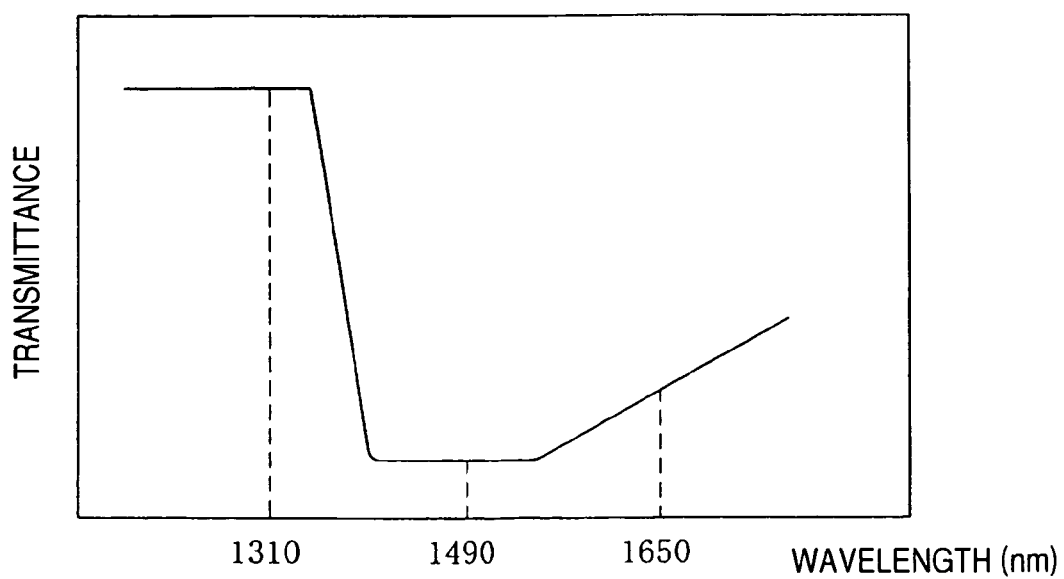
FIG. 2 shows the transmission characteristic of a first multilayer film filter constituting a wavelength branching filter.
Figure 3:
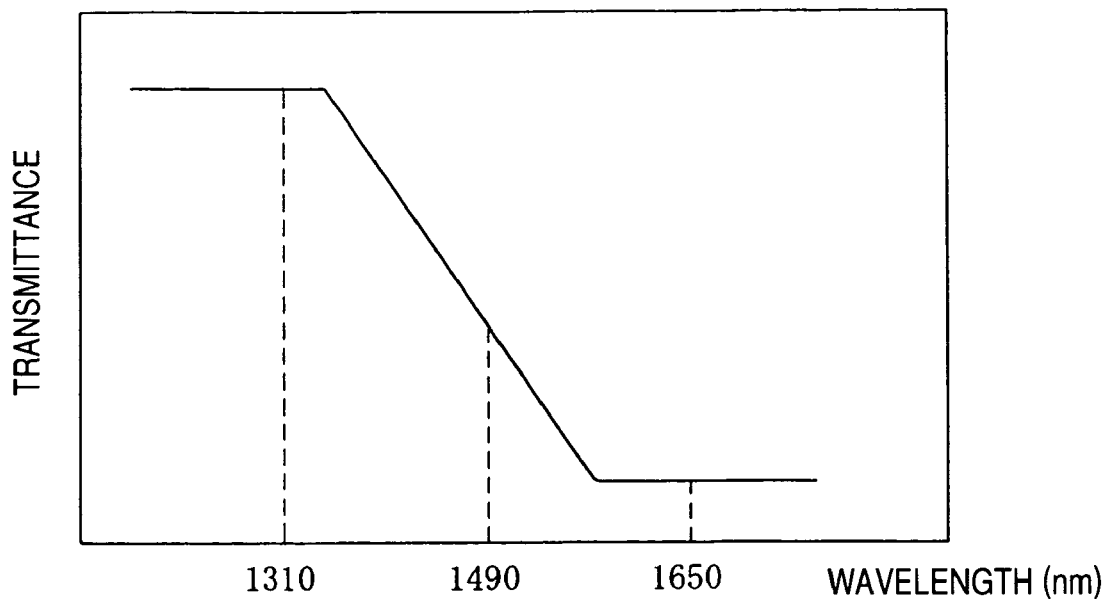
FIG. 3 shows the transmission characteristic of a second multilayer film filter constituting a wavelength branching filter.

FIG. 2 shows the transmission characteristic of the wavelength of the first multilayer film filter 11 and FIG. 3 shows the transmission characteristic of the wavelength of the second multilayer film filter 12, respectively. As shown in FIG. 2, in the first multilayer film filter 11, the transmittance is high in 1310 nm, is rapidly reduced in the range of 1310 nm to 1490 nm and is low in 1490 nm, while the reflectance is high. As the wavelength becomes larger than 1310 nm, the transmittance is gently raised. Accordingly, the first multilayer film filter has the middle transmittance in 1650 nm.

In addition, as shown in FIG. 3, in the second multilayer film filter 12, the transmittance is high in 1310 nm and as the wavelength gets larger than 1310 nm, the transmittance is gently lowered. And the transmittance is lowered in 1650 nm. Since light of 1490 nm wavelength band is reflected by the first multilayer film filter 11 disposed in the incoming side and is not nearly received, the second multilayer film filter 12 needs not to have characteristic in reflecting light of 1490 nm wavelength band. That is, since the transmission characteristic may have low rectangular property, the film thickness of the filter can be thinned.

Figure 4:
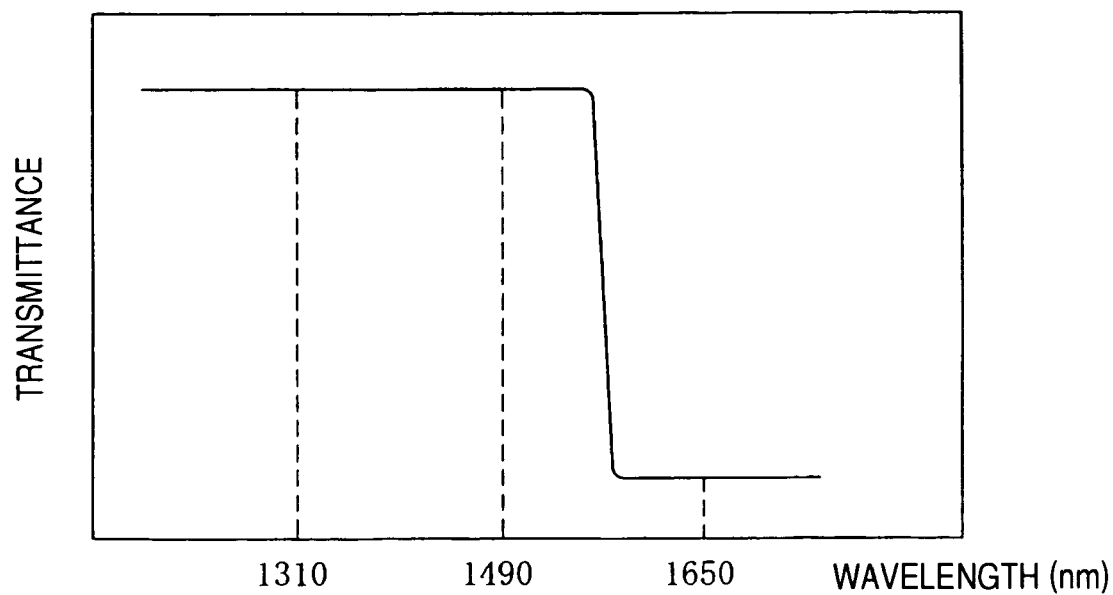
FIG. 4 shows the transmission characteristic in case that a first multilayer film filter is constructed to reflect light of long wavelength side.

Meanwhile, in case that filters having different reflection center wavelength are overlapped, a filter reflecting a long wavelength side is disposed in the incoming side. That is, the first multilayer film filter 11 has characteristic in reflecting light of 1650 nm wavelength band and the second multilayer film filter 12 has characteristic in reflecting light of 1490 nm wavelength band. In this case, the transmission characteristic of the first multilayer film filters 11 for achieving the good branching characteristic is shown in FIG. 4.

When the first multilayer film filter 11 is constructed to reflect light of 1650 nm wavelength band which is a long wavelength side, if a part of light of 1490 nm wavelength band reflected on the second multilayer film filter 12 is reflected on the first multilayer film filter 11, light of 1490 nm wavelength band is reflected on two sections such as the first multilayer film filter 11 and the second multilayer film filter 12, thereby being dually separated. If light of 1490 nm wavelength band is dually separated, since the focus is doubled in the light collecting unit, light is remarkably lost.

To prevent the dual focusing, the transmittance of light of 1490 nm wavelength band needs to be enlarged to the maximum in the first multilayer film filter 11. Accordingly, as shown in FIG. 4, the first multilayer film filter 11 needs to be constructed to have the high rectangular property in the range of 1490 nm to 1650 nm. In addition, since light of 1310 nm wavelength band needs to be transmitted, a filter having high transmittance in a wide band of 1310 nm to 1490 nm is required. Therefore, the film thickness of the first film filter 11 needs to be thick, whereby the cost is incremented.

Since the wavelength branching filter 1 according to the embodiment of the present invention reflects light of 1490 nm wavelength band on the first multilayer film filter 11 which is an incoming side of light, the second multilayer film filter 12 that reflects light of 1650 nm wavelength band needs not to raise the transmittance in 1490 nm wavelength band and may have the low rectangular property as shown in FIG. 3. Accordingly, the film thickness of the filter that reflects light of 1650 nm wavelength band can be thinned, whereby the cost down can be attempted.

Figure 5:
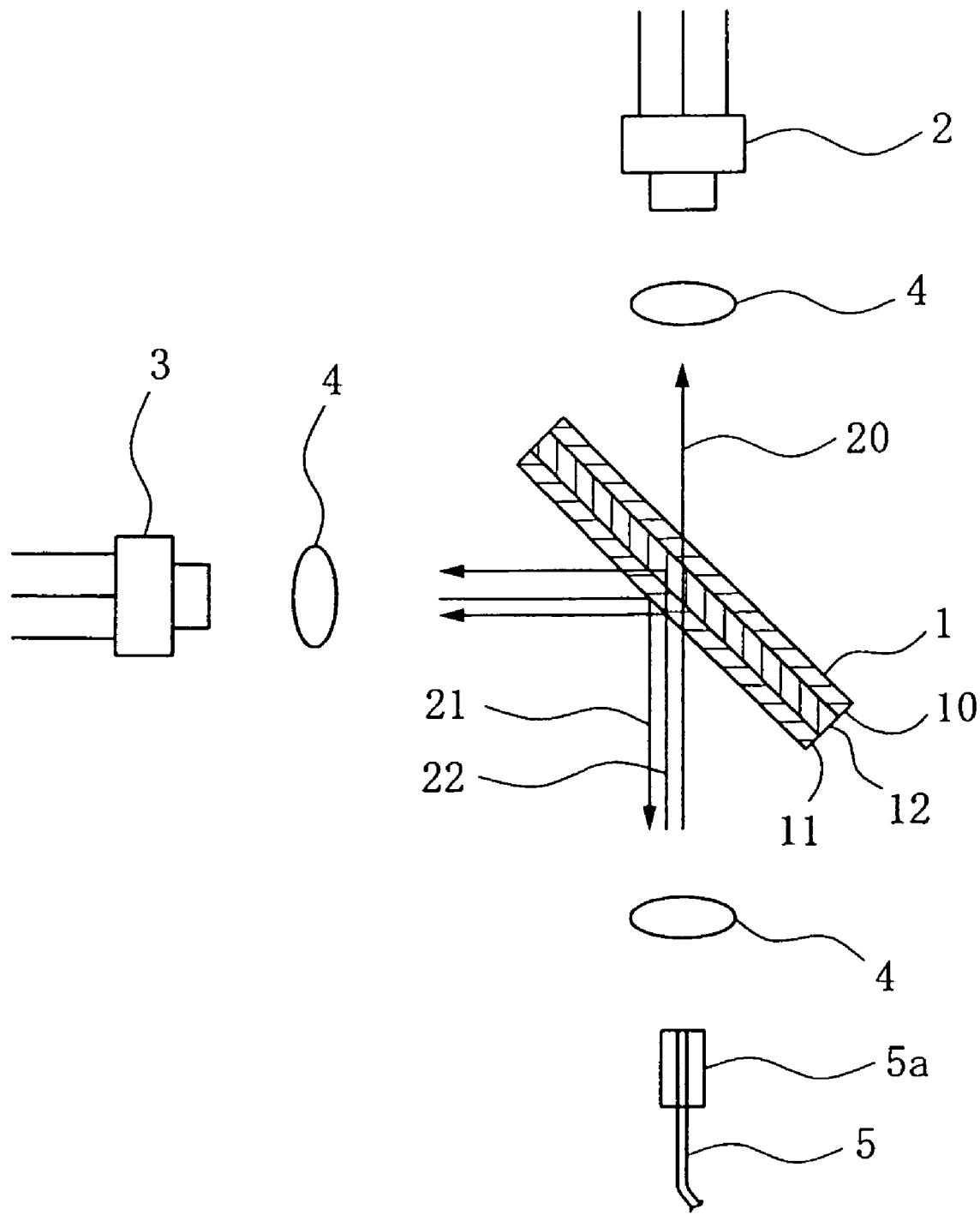
FIG. 5 is a block diagram of an optical communication module using a wavelength branching filter of this embodiment.

Next, the optical communication module using the wavelength branching filter 1 will be described. FIG. 5 is a block diagram of the optical communication module using the wavelength branching filter 1 of this embodiment. As shown in FIG. 5, the optical communication module is constituted by a light collecting unit 2 that collects light, a light emitting unit 3 that emits light, an optical fiber 5 that propagates light and the above-referenced wavelength branching filter 1.

The light collecting unit 2 which collects light of 1310 nm wavelength band is constituted by a photo diode. The light emitting unit 3 which emits light of 1490 nm wavelength band is constituted by a laser diode. The optical fiber 5 in which a ferrule 5a is provided on an apical portion is fixed within the optical communication module. Further, the wavelength branching filter 1 is fixed within the optical communication module by a UV adhesive.

The light collecting unit 2 is provided along the optical axis of the optical fiber 5 and the light emitting unit 3 is provided orthogonally to the optical axis of the optical fiber 5. In addition, lens 4 is provided in front of the light collecting 2, light emitting unit 3 and optical fiber 5, respectively, thereby converting a radiating light into a parallel light or the parallel light into a convergent light.

The wavelength branching filter 1 is disposed in the intersection position of the optical axes of the light collecting unit 2 and the light emitting unit 3 to be at the angle of 45 degrees to each axis. Light 20 of 1310 nm wavelength band is received into the wavelength branching filter 1 from the optical fiber 5 and light 21 of 1490 nm wavelength band is received into the wavelength branching filter 1 from the light emitting unit 3. In addition, light 20 of 1310 wavelength band and light 22 of 1650 nm wavelength band are transmitted from the optical fiber 5 simultaneously, thereby being received into the wavelength branching filter 1.

Light 20 of 1310 nm wavelength band from the optical fiber 5 is transmitted onto the first multilayer film filter 11 and second multilayer film filter 12 of the wavelength branching filter 1 and is collected into the light collecting unit 2. Further, light 21 of 1490 nm wavelength band from the light emitting unit 3 is reflected by the first multilayer film filter 11 of the wavelength branching filter 11 at the angle of 90 degrees through the lens 4 and is received into the optical fiber 5 through the lens 4.

Light 22 of 1650 nm wavelength band is reflected onto both the first multilayer film filter 11 and second multilayer film filter 12 of the wavelength branching filter 1 at the angle of 90 degrees, respectively. Since the light emitting unit 3 exists and the light collecting unit 2 does not exist in the direction reflected by the wavelength branching filter 1, light 22 cannot be detected by the light collecting unit 2 as an error signal. As shown above, since lights of 1310 nm and 1490 nm wavelength bands can be branched by the wavelength branching filter 1, respectively, and light of 1650 nm wavelength band cannot be incident onto the light collecting unit 2, whereby the two-way communication can be implemented.

As shown above, the embodiments of the present invention have been described, but the present invention is not applied only to these embodiments, but can be variously applied within the technical idea scope.

The invention claimed is:

1. A wavelength branching filter, comprising:
a first multilayer film positioned in an incoming light side on a glass substrate and a second multilayer film positioned in an outgoing light side,
wherein the first multilayer film has characteristic in reflecting light of 1490 nm wavelength band and transmitting light of 1310 nm wavelength band, and the second multilayer film has characteristic in reflecting light of 1650 nm wavelength band and transmitting light of 1310 nm wavelength band.

2. An optical communication module, comprising:
a light collecting unit collecting light of 1310 nm wavelength band, which is disposed along an optical axis of an optical fiber;
a light emitting unit emitting light of 1490 nm wavelength band, which is disposed orthogonally to the optical axis of the optical fiber; and
a wavelength branching filter which is disposed at an intersection position of the optical axes of the light collecting unit and the light emitting unit, comprising:
a first multilayer film positioned in an incoming light side on a glass substrate and a second multilayer film positioned in an outgoing light side, the first multilayer film having characteristic in reflecting light of 1490 nm wavelength band and transmitting light of 1310 nm wavelength band, and the second multilayer film having characteristic in reflecting light of 1650 nm wavelength band and transmitting light of 1310 nm wavelength band,
wherein light which the light emitting unit transmits is reflected to a cross-section direction of the optical fiber and light transmitted from a cross section of the optical fiber is transmitted.

* * * * *